United States Patent [19]

Kaiser et al.

[11] Patent Number: 5,182,554
[45] Date of Patent: Jan. 26, 1993

[54] THIRD PARTY EAVESDROPPING FOR BUS CONTROL

[75] Inventors: John M. Kaiser, Cedar Park; Joe C. St. Clair, Round Rock, both of Tex.

[73] Assignee: International Business Machines Corporation, Armonk, N.Y.

[21] Appl. No.: 629,864

[22] Filed: Dec. 18, 1990

[51] Int. Cl.[5] .............................................. H04B 1/00
[52] U.S. Cl. ................................ 340/826; 340/825.79
[58] Field of Search ........... 340/825.79, 825.8, 825.83, 340/826; 379/7, 9, 16, 242, 270, 272, 279

[56] References Cited

U.S. PATENT DOCUMENTS

| | | | |
|---|---|---|---|
| 4,119,803 | 10/1978 | Jacob | 370/13 |
| 4,256,926 | 3/1981 | Pitroda et al. | 379/269 |
| 4,264,782 | 4/1981 | Konheim | 380/25 |
| 4,412,282 | 10/1983 | Holden | 395/325 |
| 4,539,564 | 9/1985 | Smithson | 340/825.79 |
| 4,551,831 | 11/1985 | Vaughn | 370/58.2 |
| 4,580,011 | 4/1986 | Glaser | 379/112 |
| 4,710,868 | 12/1987 | Cocke et al. | 395/325 |
| 4,929,939 | 5/1990 | Varma et al. | 340/825.8 |

OTHER PUBLICATIONS

IBM Technical Disclosure Bulletin, vol. 31, No. 1, Jun., 1988. "Cross Point Switch Tracer".

Primary Examiner—Donald J. Yusko
Assistant Examiner—Dervis Magistre
Attorney, Agent, or Firm—Casimer K. Salys; Thomas E. Tyson

[57] ABSTRACT

A communication system for providing a communication path between two of a plurality of devices. A first port is provided that is connected to at least one device. A second port is provided connected to a second device. A switch is provided connecting the two ports for communications connection between the ports in response to commands form the devices to each other. The switch includes the capability to monitor communications between the devices and to determine when a change is to be made in the communications path and then to make the change accordingly.

16 Claims, 10 Drawing Sheets

THIRD PARTY EAVESDROPPING FOR BUS CONTROL

CROSS REFERENCE TO RELATED PATENT APPLICATIONS

This application is related to copending U.S. patent application Ser. No. 07/874,999 filed Apr. 24, 1992, which is a continuation of patent application Ser. No. 07/629,511 filed Dec. 18, 1990, now abandoned, and copending U.S. patent application Ser. No. 07/629,748 filed Dec. 18, 1990 now U.S. Pat. No. 5,144,293.

TECHNICAL FIELD

This invention relates to data processing system communications and, more specifically, to a circuit for regulating the flow of information over an information bus by eavesdropping on communications between two devices.

BACKGROUND ART

Data processing systems often require that peripheral devices, terminals or a multiple of computers communicate. In a high performance data processing system, the intercommunications between system components is critical in gaining the high performance required. An example of a high performance system commonly used is the telecommunications system.

U.S. Pat. No. 4,256,926 is an example of a microcontrolled telecommunications switching system that includes distributed control through distributed microprocessors where the microprocessors include buffers that provide for the communications required between the microprocessors.

U.S. Pat. No. 4,119,803 discloses a telephone exchange switching system that is controlled by a pair of control units which, through a centralized mechanism, include multiple registers for controlling traffic and a dialog portion that provides control and information communications with the telephone exchange equipment.

U.S. Pat. No. 4,412,282 discloses a microprocessor controlled telephone switching circuit that provides for increased reliability through data and address parity circuits.

U.S. Pat. No. 4,580,011 is a distributed processing telephone switching system that includes a master control microprocessor that in turn controls several special function microprocessors.

The difference between a telecommunications circuit and the common data processing intercommunication circuit is that in a data processing system the number of terminals for communication are fewer and that data throughput required for the data processing system communication is generally higher. However, dynamic interconnectibility is still a requirement. Therefore, different techniques are provided for communicating between one element of the data processing system and another. An example of this is illustrated in U.S Pat. No. 4,264,782 where a host processor is communicating to several terminals through a data communication network. In this system, communications can be encrypted but are still controlled by the host CPU. When the host CPU is master, the terminals become slaves and all control of the communications over the data communications network is then controlled by the host CPU. This can be a bottleneck when the data processing systems include several autonomous elements requiring communications.

U.S. Pat. No. 4,551,831 is another example of a data processing communications network that illustrates a multiplex switch used to control several channels. A central CPU controls the multiplex switch. A further illustration of data processing element communications is illustrated in U.S. Pat. No. 4,710,868 that illustrates the interconnection of several workstations to a central memory. The workstations access the central memory through a two level switch that provides for virtual to real address translation, as well as switching.

Many high performance data processing communications systems require that several data processing elements communicate simultaneously with each other. This capability is provided by using a cross point switch. An example of a cross point switch implementation is illustrated in U.S. Pat. No. 4,539,564. This is compared with a single information bus that provides only a single channel of communication at any one time. In a typical configuration, a cross point switch will provide the capability for any terminal to talk with any other nonbusy terminal on the system and further provide for simultaneous communications between several terminal pairs. Traditionally this is accomplished by a terminal requesting access to the cross point switch through a central switch controller to determine if the receiving terminal can receive a transmission from the originating terminal. Upon receiving a status signal indicating that such communications can be completed, the cross point switch is commanded to make the connection between the transmitting terminal and the receiving terminal in order that the two terminals can exchange information. When the communication is to be ended, the originating terminal traditionally signals the central controller of the cross point switch to disconnect the receiving terminal.

It is an object of the present invention to provide an intelligent mechanism for regulating the intercommunication between elements in a data processing system by monitoring their communications to determine when a change in the communications system is to be made. This objective is accomplished by monitoring the transmissions between the two system elements.

U.S. Pat. No. 4,539,564 that illustrates an embodiment of a cross point type switch which discloses monitors inputs and outputs. However, this monitoring is only provided for maintenance to determine when error conditions occur and the sources of these error conditions. Likewise, *IBM Technical Disclosure Bulletin*, Vol. 31, No. 1, June, 1988, entitled "Cross Point Switch Tracer", also includes a maintenance circuit to monitor and time stamp communications through a cross point type switch. Neither of these references, nor the other references detailed above, describe any mechanism in which the communications are monitored in order to regulate the communications over an information bus.

DISCLOSURE OF THE INVENTION

In accordance with the present invention, a communications system is provided that establishes a communication path between two of a plurality of devices connected to the communications system. The system further includes a first port circuit that is connected to at least one device and a second port circuit that is connected to at least a second device. A switch is connected between the first and second ports that provides communication connections between the ports. The switch further includes a monitoring circuit for monitoring communications between devices to determine that a change in the communications path is to occur and to change the communications path accordingly.

In a preferred embodiment, a data processing system is provided that is connected to a cross point switch through a plurality of ports. In operation, a device connected to a port will send a transmission to the port to establish communication through the cross point switch and a second port to another device. The cross point switch in the preferred embodiment includes a monitoring circuit to monitor the communication between these two ports to determine when a communications termination is to occur. The cross point switch then connects or disconnects the ports between the two devices.

BRIEF DESCRIPTION OF THE DRAWING

The foregoing and other objects, aspects and advantages of the invention will be better understood from the following detailed description of Best Mode for Carrying Out the Invention with reference to the figures listed below, in which.

BEST MODE FOR CARRYING OUT THE INVENTION

Figure 1:
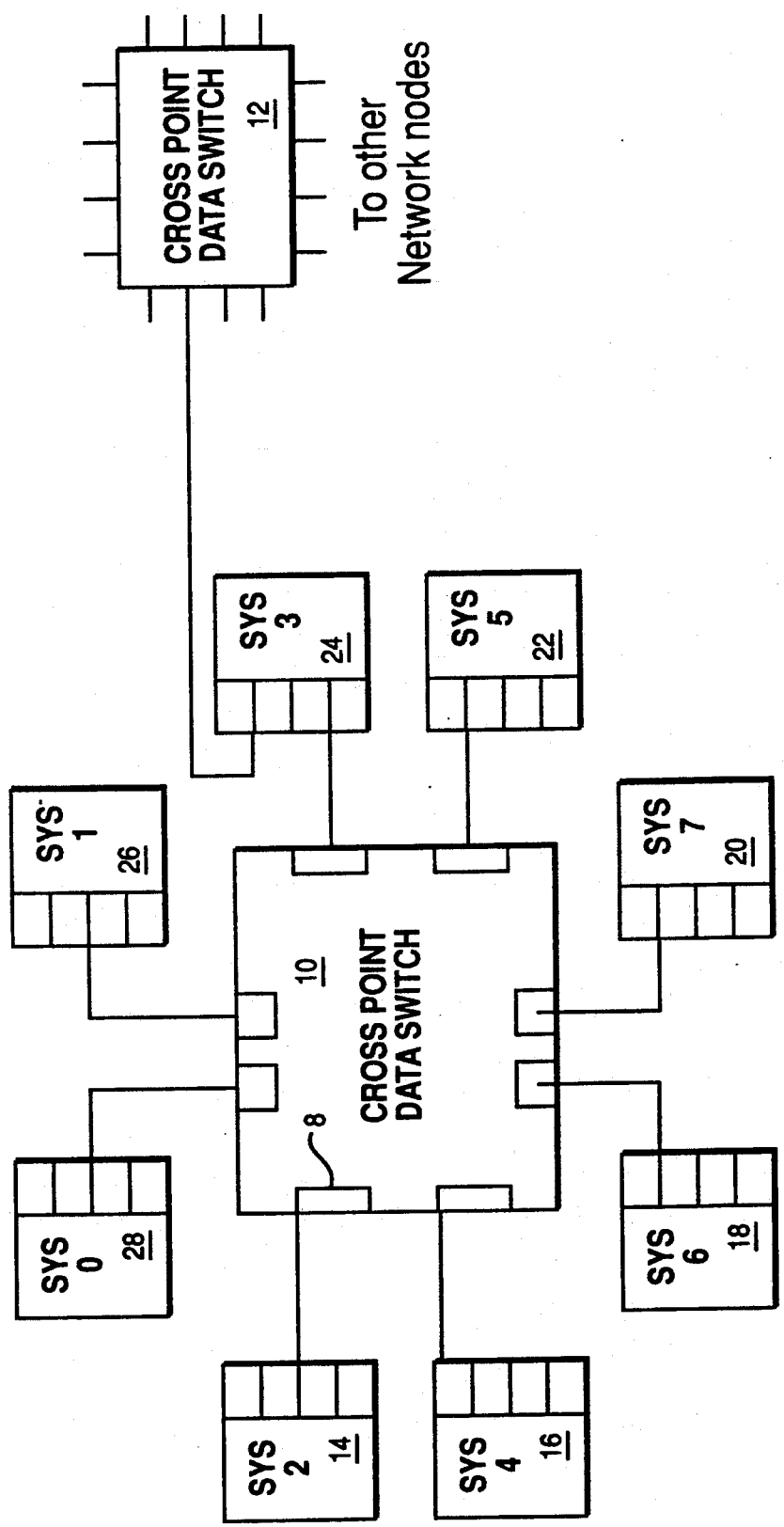
FIG. 1 is a block diagram illustrating eight systems connected to a first cross point switch and one connected to a second cross point switch.

FIG. 1 is a block diagram of a communications system that includes several systems 14, 16, 18, 20, 22, 24, 26 and 28 that are each connected to a cross point switch 10. Each of the systems, such as system 14, is connected to cross point switch 10 through a port 8. Note that each system, such as system 24, can be alternatively connected to additional cross point switches (such as switch 12) for redundancy or connectivity. In the preferred embodiment, system 14 and system 24 are RISC System/6000 workstations that are connected by a serial fiber optic channel to the cross point switch 10. In this preferred embodiment, each RISC System/6000 can include four ports to implement the serial link interconnections. An example of a protocol used with the serial link interconnection is ESCON (Enterprise System Connection for the IBM 3090 Enterprise System Serial Input/Output Channel). It should be understood in this preferred embodiment that when a system is to connect to another system to provide information to the second system, all information is provided through this serial link fiber optic channel. The originating system will send out a frame of information of up to 32 bytes to initially establish communications with the receiving system. After the first frame has been sent and received establishing the connection through the cross point switch 10, this connection is maintained so that the originating system may continually pass additional frames of information to the receiving system until a disconnect frame has been sent to alert the receiving system and the switch 10 that it is being disconnected. In the preferred embodiment, the cross point switch is an $N \times N$ switch supporting $N \times N$ ports to provide simultaneous communication between connected ports and the systems connected to the ports.

Figure 2:
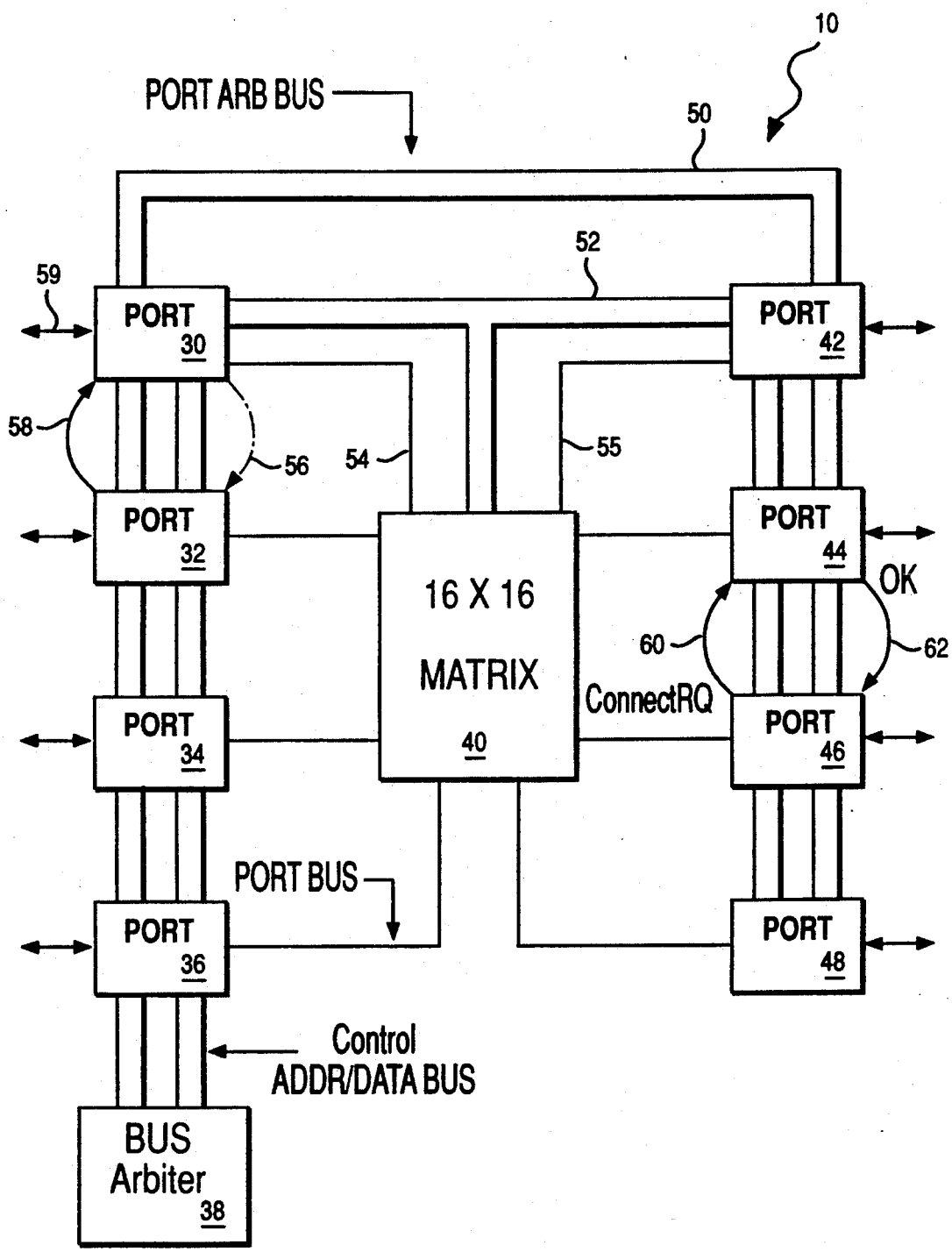
FIG. 2 is a block diagram illustrating the contents of a cross point switch.

FIG. 2 is a block diagram of the cross point data switch 10. In the preferred embodiment, a 16×16 switch is provided. For this description only, eight ports of the 16 are shown. Each port 30 is connected to a port arbitration bus 50, port control bus 52 and data transfer lines (such as lines 54 and 55 for ports 30 and 42, respectively). Each of the ports are connected through these data lines to the 16×16 matrix switch 40. The matrix switch 40 can be an off-the-shelf part such as the GIGABIT Logic 10G051, which provides cross point interconnection between ports (with the exception of logic 600 and address latches 602, FIG. 4).

In the preferred embodiment, each port provides an optical-to-electrical conversion in order that the information is passed electrically between ports through the 16×16 matrix 40. Initially, a port, such as 30, may attempt a connection to another port, such as port 32. First, port 30 requests arbitration. That is, port 30 requests a grant on the arbitration bus 50 through the bus arbiter 38. Upon receiving a grant, a connect request is passed over the control bus 52 to port 32. A status is then received. In FIG. 2, an example is illustrated where port 32 is attempting to contact port 30 by sending a request symbolically indicated by the arrow 58. Port 30 sends a busy signal indicated symbolically by the dashed arrow 56 back to port 32 declining the transfer request. Note that during this initial attempt at port-to-port connection, the 16×16 matrix has not been accessed. This is possible by having the control of the switch mechanism distributed among the ports. In other words, it is only after confirmation is received that the data transfer can take place and that the switch 40 is involved in the connection between the ports.

The matrix switch 40 is connected to the control bus 52. This may enable the matrix switch 40 to respond to commands directed to it. In the preferred embodiment, the only commands that are directed to the matrix switch 40 are those of a diagnostic nature. During normal operation, the matrix switch 40 merely monitors the control bus 52 and the control communication between ports to determine when connections are to be made or terminated. When connections are made, lines such as 54 are connected to lines such as 55 to allow for data transfers between ports such as port 30 and port 42 without requiring explicit commands to the switch from the ports or from some other control.

The disconnection operation is performed by the matrix switch 40 without any commands from the ports. The matrix switch 40 eavesdrops on the command bus 52 to determine when the disconnection is to be made by examining the commands for a disconnect on the control bus 52. When a termination frame is being sent from one system to another, the matrix switch 40 by monitoring the control bus 52 automatically determines when the connection is to be broken; thus, saving time by not requiring a separate command protocol to tell the matrix switch to disconnect. This is important because the disconnection operation is a high priority, since further connections with either of these ports can only be made when this disconnection occurs.

Figure 3:
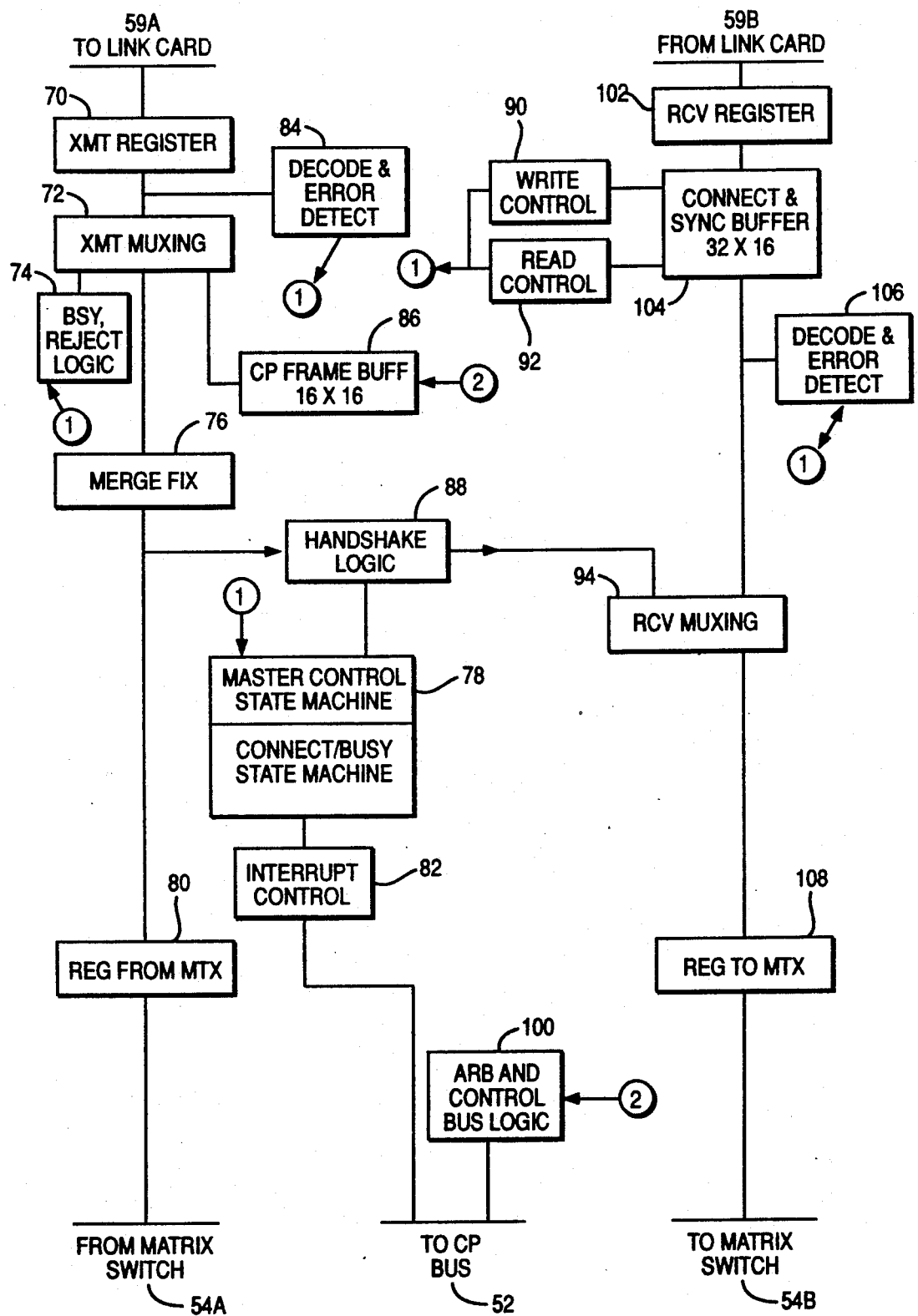
FIG. 3 is a block diagram illustrating the contents of a cross point switch port circuit.

FIG. 3 is a block diagram of the logic contained in each port, such as port 30. The master control state machine and connect/busy state machine 78 control the operation of the port logic. State logic 78 is connected to an interrupt control 82 that provides interrupts for error conditions to and from the control bus 52. The state logic 78 is further connected to the handshake logic 88. The handshake logic operation is of the type discussed in *IBM Technical Disclosure Bulletin*, Vol. 32, No. 6A, November, 1989, pp. 21-22, entitled "Method for Validating Dynamic Data Paths in a Data Switching Unit", herein incorporated by reference. When a frame is first received from a system, it is received over a bus 59B where it is initially latched a character at a time in a receive register 102. The contents of this register are then loaded into the connect/synchronization buffer 104 where write control or read control logic 90 and 92, respectively, together with state logic 78, determine whether buffer 104 acts as a pass-thru First-In/First-Out buffer or a capture buffer. The write control 92 determines where in the buffer 104 the data is to be written. The read control logic 90 determines from where in the buffer 104, the next character is to be read out. The decode and error detection logic 106 is also connected to the state logic 78 to signify any error conditions. If the frame is to be passed to another port, a request for connection is passed through the control bus. As discussed earlier, the arbitrator sends a request to the bus arbitrator 38 over bus 50 through the arbitration and control bus interface 100. Upon a grant, the port state machine 78 sends a connect request and evaluates the status received over the control bus 52 from the port to be connected. If the port to be connected is not busy, then the connection is automatically established by the matrix 40 and the data from the connect/synchronization buffer 104 is passed through register 108 onto the data line 54B to the matrix switch. The receive multiplexer 94 determines if data from the link 59B or the handshake logic 88 is to be loaded into register 108. Likewise, data being received from the matrix switch on line 54A passes through the register 80 through a merge logic circuit 76 which prevents block code errors through the transmit multiplexer 72 to the transmit register 70 to be passed out on bus 59A. Note that in the transmission side, both busy and reject logic 74 and decode and error detect logic 84 are provided for error conditions. The busy/reject logic 74 determines when a busy indication has been received from the control bus 52 and provides a busy frame on line 59A. Frame buffer 86 is provided to transmit previously specified frames indicating specific error conditions.

Figure 4:
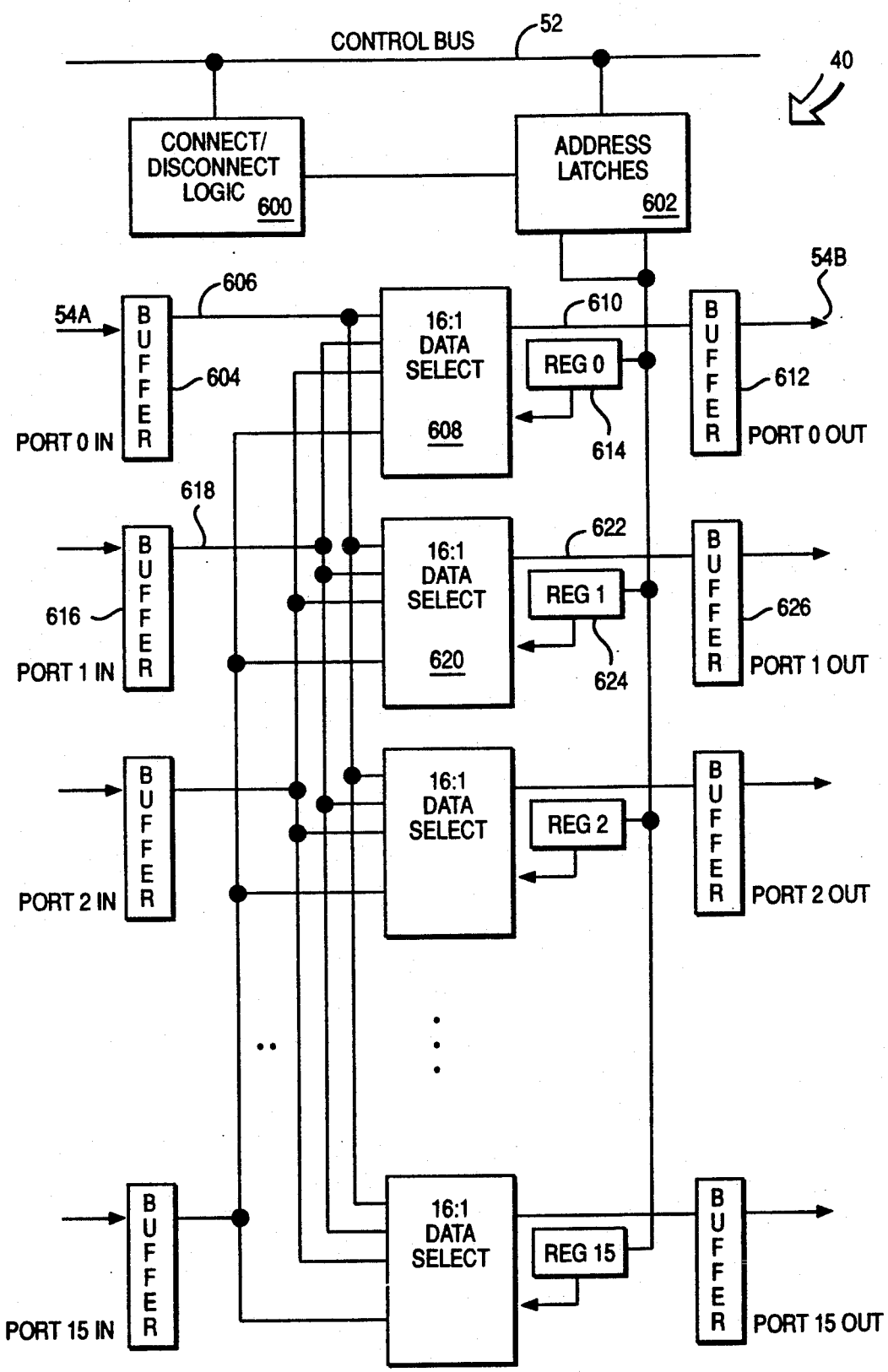
FIG. 4 is a block diagram of the cross point switch.
Figure 5A:
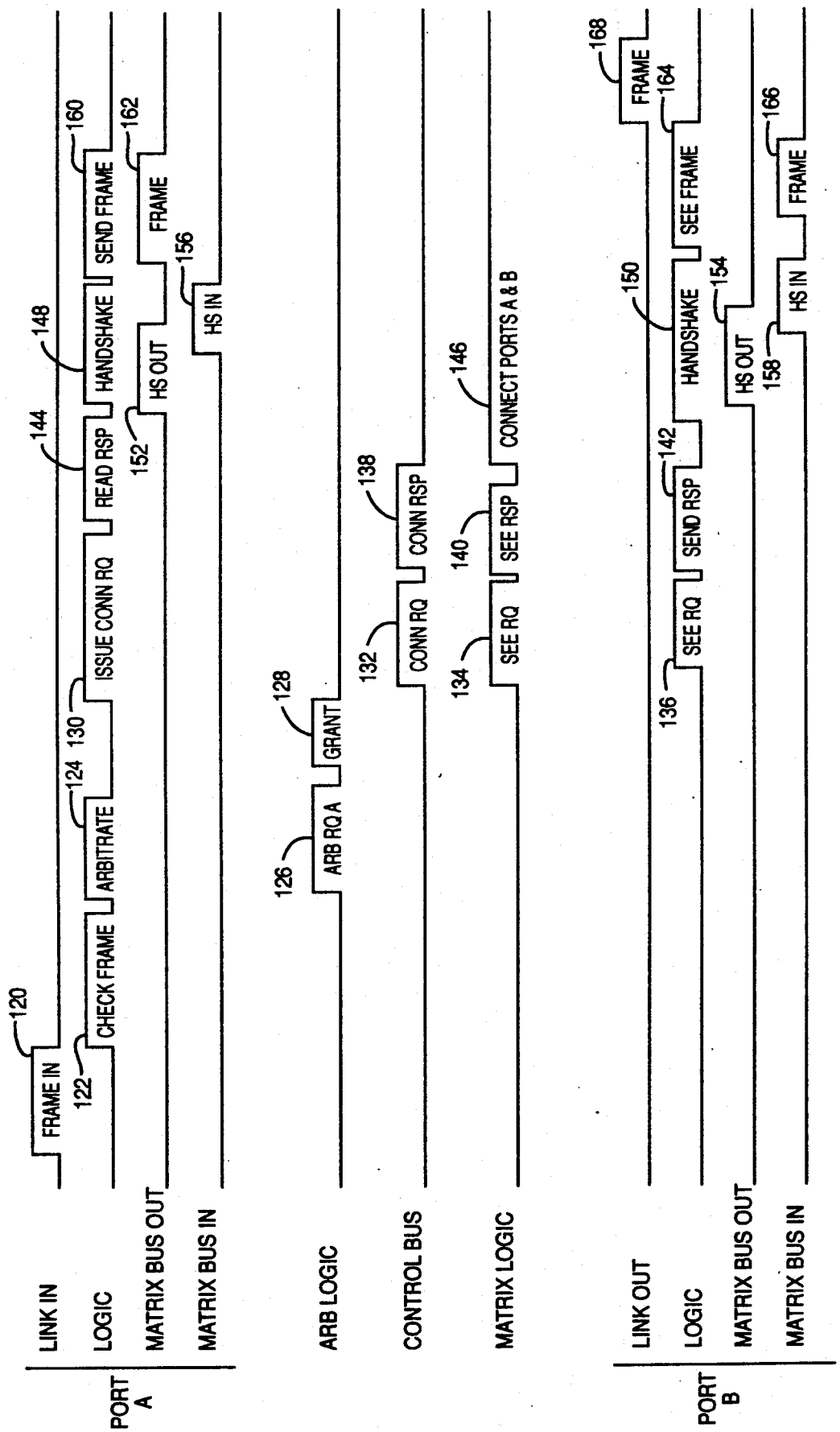
FIG. 5A is an event diagram illustrating the events between port A, port B and the cross point switch in establishing a link between port A and port B.

FIG. 5A is an event diagram illustrating an interconnection between port A and port B. In FIG. 5A, a frame is first received by a port on a bus (such as 59B) at event 120. At event 122, the port logic examines the frame and determines to establish a connection and, at event 124, to arbitrate for the control bus. The bus arbitrator 38 receives the request at event 126 and grants the request at event 128. At that time, the port A logic issues a connect request 130 which includes the port addresses involved on the control bus 52 indicated by event 132. The matrix logic 600. FIG. 4, observes this request at event 134 and latches the addresses of the port which are latched in latches 602 while the port B logic sees this request at event 136. The port B logic then sends a response 142, which is seen by the matrix logic 600 at event 140 over the control bus 52, as illustrated by event 138. This response is read by the port A logic at event 144. In this example, a successful connection is being performed. Therefore, the matrix logic 600 loads the port address from latches 602 to the registers such as 614 and 624 to enable the data select circuits 608 and 620 to connect internal bus 606 to internal bus 622. Port A logic then provides handshake signals with port B over the matrix bus, such as 54A and 54B. First the handshake out event 152 and 154 are provided from both ports and then the handshake in events 156 and 158 are provided back from both ports to the opposing ports. Note that the matrix logic has automatically connected ports A and B through the matrix switch 40. Finally, the frame is sent at event 160 out on the matrix bus event 162 to the matrix in line to port B 166 where the port logic examines the frame at event 164. This frame is then provided on the output of the link to the connected device at event 168.

Figure 5B:
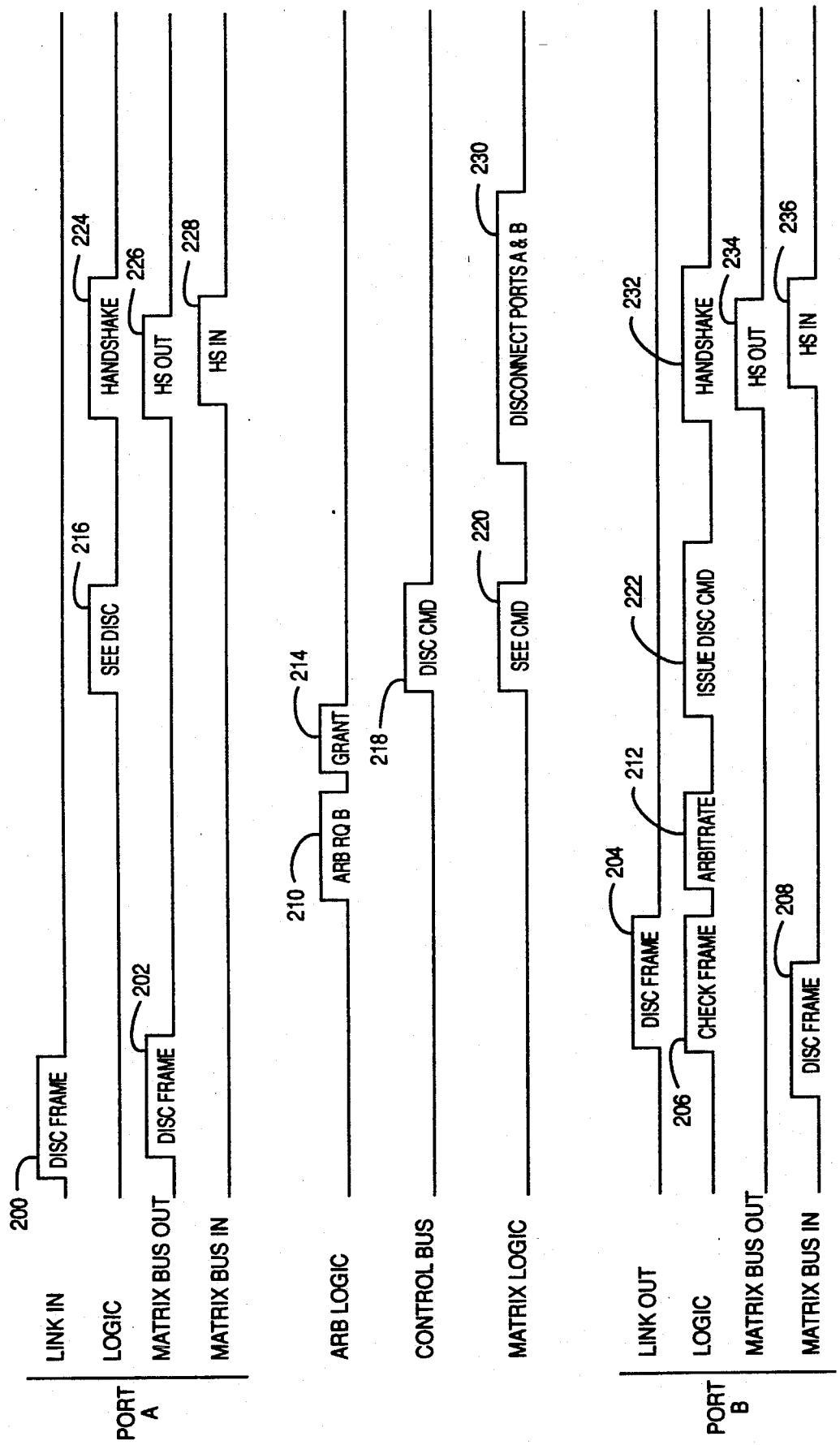
FIG. 5B is an event diagram illustrating a disconnection between port A and port B.

FIG. 5B is an event diagram illustrating a disconnect operation. In this example, port A receives a disconnect frame from its connected device at event 200. This is passed to the matrix out bus event 202. This is received by port B on the matrix in bus at event 208 where the logic checks the frame at event 206 and the frame is dispatched to the linked device at event 204. The logic in port B then determines to arbitrate for the control bus at event 212 and is received by the bus arbiter 38 at event 210, which grants the request at event 214. The port B logic then issues the disconnect command at event 222, which is seen on the control bus at event 218, by the matrix logic at event 220, and by port A logic at event 216. Then the handshake is provided at events 232 and 224 by ports B and A, respectively, through the matrix in and matrix out lines for the respective ports at events 226, 228, 234 and 236, respectively. The important event is when the matrix logic 40 automatically disconnects ports A and B at event 230 by eavesdropping on the command bus and having seen the disconnect command successfully issued.

It should be understood by those skilled in the art that by eavesdropping on the bus to see connect commands and disconnect commands, that further bus cycles are not required for controlling the switch, even though the switch operates in a manner to maintain an autonomous relationship between the ports.

Figure 6:
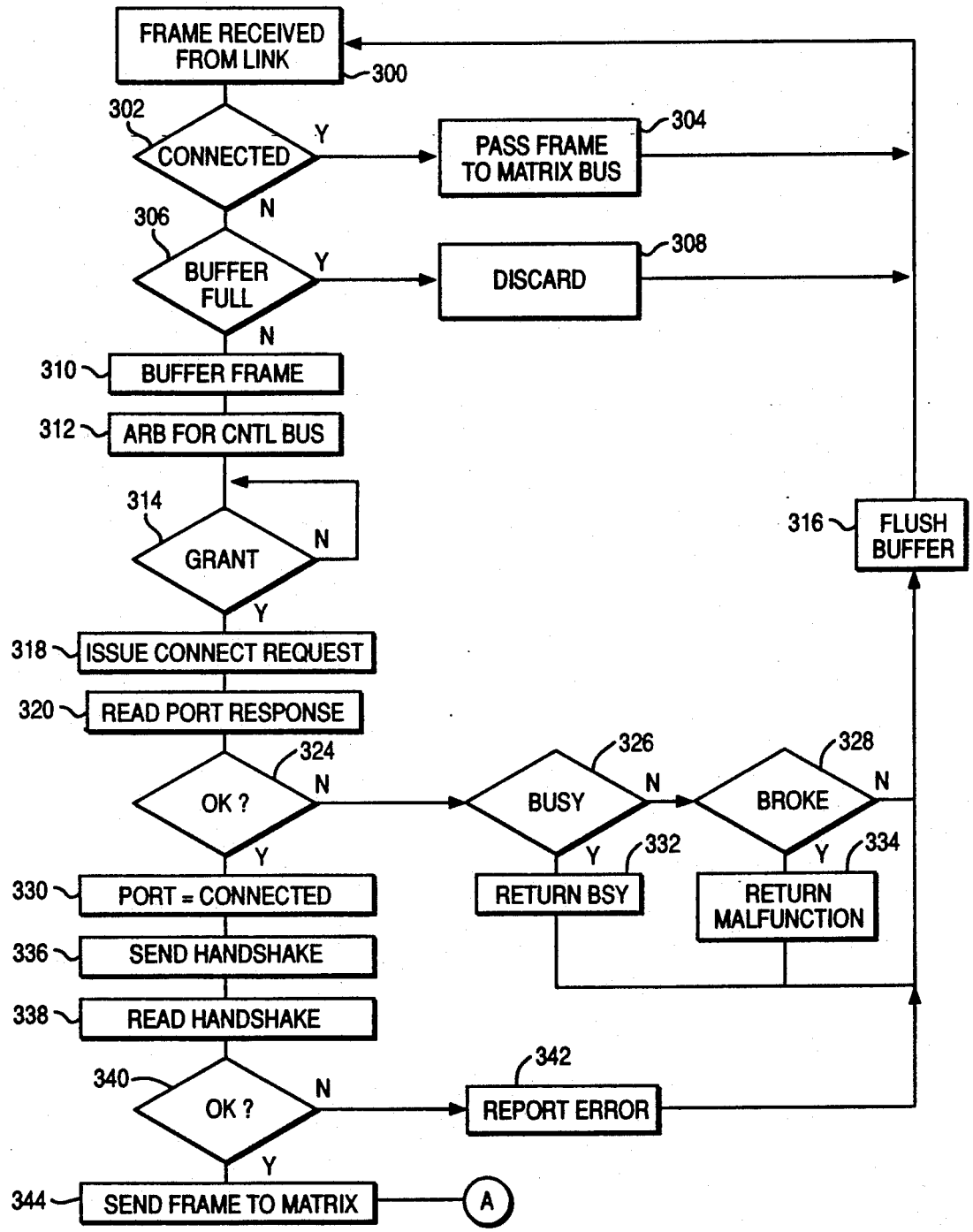
FIG. 6 is a flow chart illustrating the control of the port when a communications frame is received from its link.

FIG. 6 is a flow chart illustrating the state logic 78 of a port when it receives a frame. In block 300 a frame is received from the device connected to the link side of the port. The logic first determines if the frame is for an existing connection. This is an event when a previous frame has established the connection and this existing frame is merely one in a sequence of frames that is being passed through the existing connection. In step 304, the frame is passed through the existing connection to the matrix bus to the matrix switch. The control logic then returns to step 300 to wait for the next frame. However, if in step 302, the connection has not been previously established, the control logic determines if the buffer 104 is full. If so, the frame is discarded in step 308 and the control logic returns to wait for another frame. If the frame buffer is not full, the frame is placed in the buffer in step 310 and the control logic arbitrates for the control bus in step 312. In step 314, the logic waits for the grant to be received. At which time it proceeds to issue a connect request in step 318. In step 320, the control logic reads the requested port's response. The response is examined in step 324 to determine if it is busy (step 326), at which time a busy message is passed, or if the port indicates that it is malfunctioned (step 328), at which time a malfunction message is passed back in step 334. Returning to step 324, if the response is successful, the port is marked as connected in step 330 and the send handshake is started in step 336 through the matrix. When the receive handshake is received in step 338 it is examined in step 340. If it is not okay, an error report is issued in step 342, at which time the buffer 104 is flushed in step 316. Returning to step 340, if the handshake is completed successfully, the frame is then sent to the matrix switch 40 in step 324 and the logic proceeds to node A illustrated in FIG. 8 (which will be discussed later).

Figure 7:
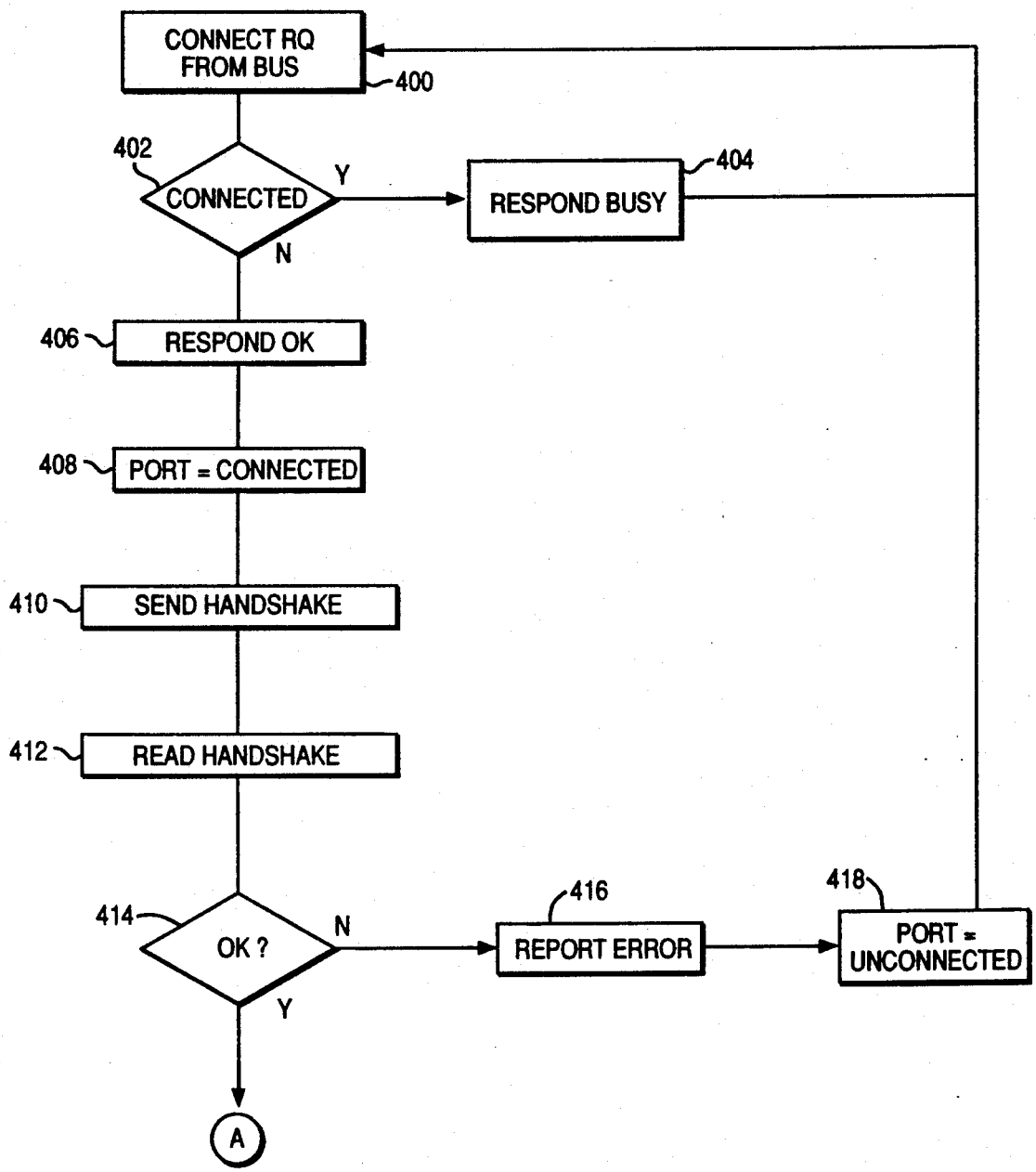
FIG. 7 is a flow chart illustrating the control of the port when a request is received from the communications bus.

In FIG. 7, a flow chart is provided that illustrates the operation of port control logic when a request has been received from the control bus. This occurs in step 400. At that time the port determines whether or not it is connected in step 402. If so, the port responds in step 404 with a busy signal. If not, in step 406, the port responds that it can complete the connection. In step 408, the port stores an indication that it is connected, and, in step 410, provides the handshake. The response handshake is received in step 412 and is examined in step 414 to determine if it is okay. If not, then an error is reported in step 416 and the port marks itself as disconnected in step 418, returning to step 400. If, however, in step 414 the handshake response is okay, then the control logic proceeds to node A.

Figure 8:
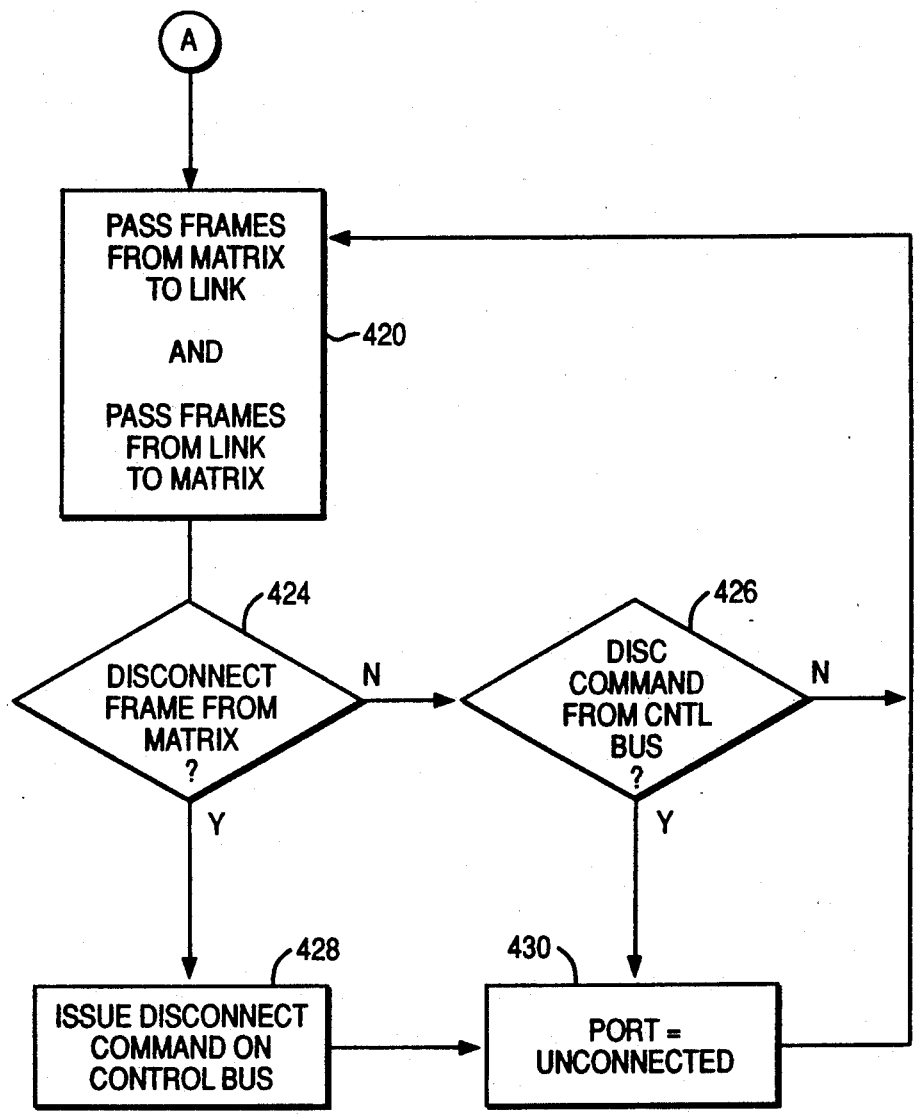
FIG. 8 is a flow chart illustrating the termination of communications by the port.

Node A is illustrated in FIG. 8 as connecting the logic in FIGS. 5 and 6 to step 420, which passes frames from the matrix to the link. Frames may also be passed from the link to the matrix, if required. In step 424, the port logic determines if a disconnect frame has been received from the matrix switch. If not, then the port logic determines in step 426 if a disconnect command has been received from the control bus. If not, then the port logic returns to step 420 to continue frame passing. Returning to step 424, if a disconnect frame has been received through the matrix switch, then, in step 428, an issue disconnect command on the control bus is made. The port is then marked as disconnected in step 430. Likewise, in step 426, if the disconnect command is received from the control bus, the port is marked disconnected in step 430.

Figure 9:
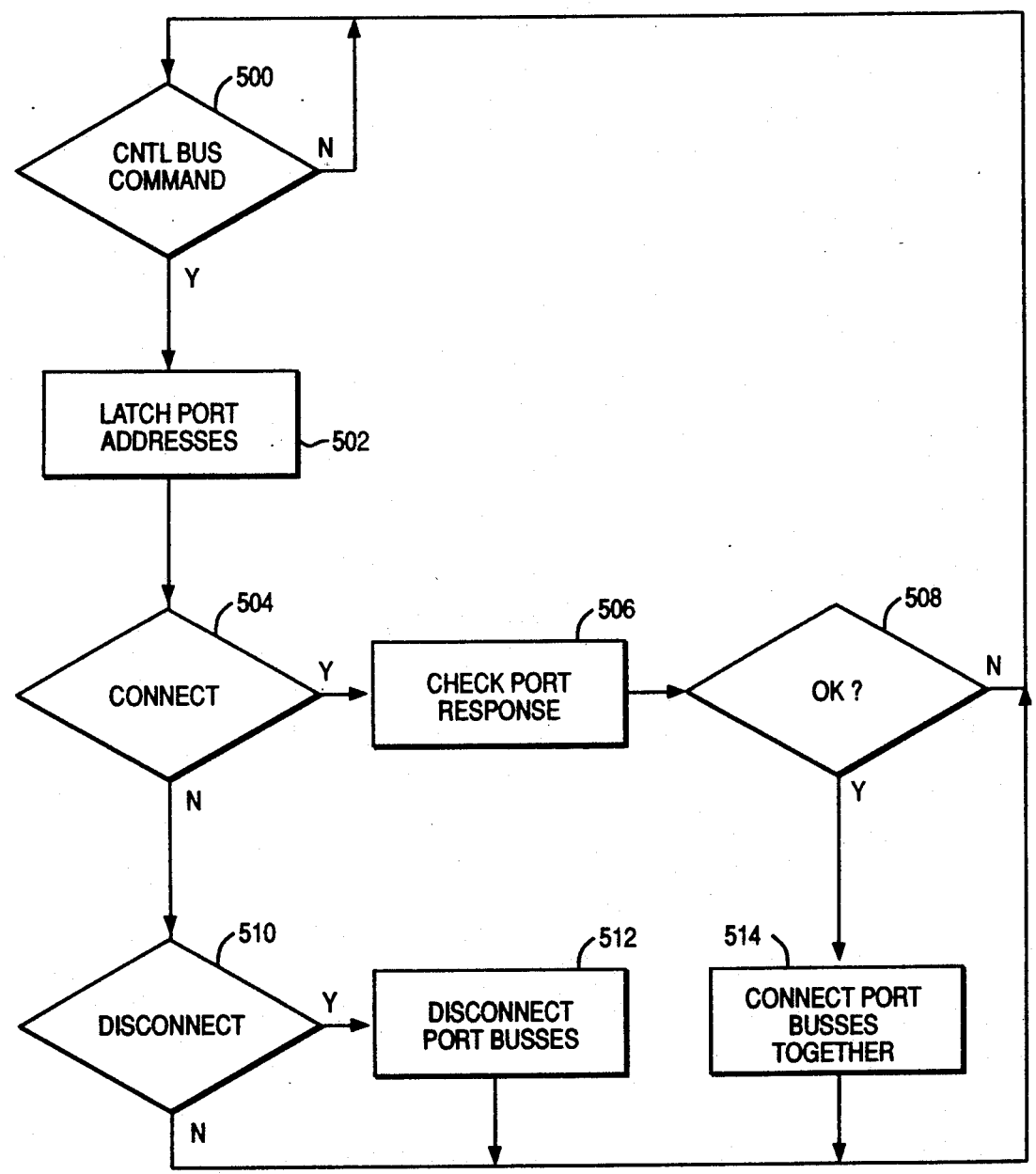
FIG. 9 is a flow chart illustrating the control of the matrix switch during the port-to-port communications.

FIG. 9 is a flow chart illustrating the control logic of the matrix switch 40. Note that the matrix switch 40 is a slave device that eavesdrops on the control bus and controls the switch connections accordingly. In step 500, the switch control logic determines if a command has been issued on the control bus. If not, it continues to wait. If a command is present, then the port addresses are latched in step 502. In step 504, the command is examined to see if it is a connect command. If so, in step 506, the port response is then monitored and checked. If the response is okay in step 508, then the bus connection between the ports is connected in step 514. Likewise, in step 510, the command is examined to see if it is a disconnect command, and, if so, then the port connections are disconnected in step 512.

It should be apparent to one of skill in the art that the eavesdropping logic of the matrix switch can also be used to control functions other than the mere connection or disconnection of devices. For example, the eavesdropping logic of the matrix switch can be used to determine when a specific event has occurred by examining information related to the connection of the two ports and for supervising the operation of autonomous devices such as preventing two consecutive connections to the same port or a disconnect operation to an unconnected port.

While this invention has been described with reference to the illustrated embodiment, this description is not intended to be construed in a limiting sense. Various modifications of the illustrated embodiment, as well as other embodiments of the invention will become apparent to those persons skilled in the art upon reference to this description. It is, therefore, contemplated that these appended claims will cover any such modifications or embodiments as fall within the true scope of the invention.

We claim:

1. A communication system for providing a continuous communications channel between two of a plurality of data processing system elements, said system comprising:
    an information bus;
    a plurality of ports, each port connected to at least one unique data processing system element and to said information bus, each port including control means for requesting or granting a channel connection with another of said ports; and
    switch means connected to said information bus and each of said ports for establishing said continuous communications channel between a requesting port and a granting port in response to a grant from the granting port.

2. A system according to claim 1 wherein said port control means provide request and grant information over said information bus directly to control means of the other port.

3. A system according to claim 2 wherein said switch means includes means for monitoring the information bus for determining when a connection request has been sent by the requesting port and when a corresponding grant has been sent by the granting port in response thereto.

4. A system according to claim 3 wherein said switch monitoring means further includes means for monitoring the communications channel between connected ports and means for disconnecting said channel when a disconnection indication is sent from one port to another over said channel.

5. A system according to claim 4 wherein said switch monitoring means further includes means for recording which ports are connected by said communications channel.

6. A system according to claim 5 wherein said switch monitoring means further includes means for recording occurrences of events indicated by information communicated over said communications channel.

7. A system according to claim 6 wherein said switch monitoring means further includes means for providing a signal upon an occurrence of a specified event indicated by information communicated over said communications channel.

8. A communications system for providing a continuous communications channel between two of a plurality of data processing system elements, said system comprising:
    an information bus;

a plurality of ports, each port connected to at least one unique data processing system element and to said information bus, each port including control means for requesting or granting a channel connection with another of said ports; and switch means connected to said information bus and each of said ports for establishing said continuous communications channel between ports and for disconnecting the channel in response to information transmitted by one of said connected ports over the channel.

9. A system according to claim 8 wherein said switch means includes means for establishing said continuous communications channel between ports in response to a grant from a granting port.

10. A system according to claim 9 wherein said port control means provide request and grant information over said information bus directly to control means of the other port.

11. A system according to claim 10 wherein said switch means includes means for monitoring the information bus for determining when a connection request has been sent by the requesting port and when a corresponding grant has been sent by the granting port in response thereto.

12. A system according to claim 11 wherein said switch monitoring means further includes means for monitoring the communications channel between connected ports and means for disconnecting said channel when a disconnection indication is sent from one port to another over said channel.

13. A system according to claim 12 wherein said switch monitoring means further includes means for recording which ports are connected by said communications channel.

14. A system according to claim 13 wherein said switch recording means further includes means for recording occurrences of events indicated by information communicated over said communications channel.

15. A system according to claim 14 wherein said switch recording means further includes means for providing a signal upon an occurrence of a specified event indicated by information communicated over said communications channel.

16. In a communication system including an information bus, a plurality of ports, each port connected to at least one unique data processing system element and to said information bus, and a switch means connected to said information bus and each of said ports, for providing a continuous communication channel between two of a plurality of data processing system elements, a method of regulating communications comprising the steps of:

generating in each port signals requesting or granting channel connection with another of said ports;

transmitting requesting or granting signals directly to respective ports; and establishing said continuous communications channel between a requesting port and a granting port responsive to detected states of the requesting port or granting port signals.

* * * * *